United States Patent
Ogasawara

(10) Patent No.: US 10,732,412 B2
(45) Date of Patent: Aug. 4, 2020

(54) DISPLAY DEVICE FOR VEHICLE

(71) Applicant: Yazaki Corporation, Tokyo (JP)

(72) Inventor: Kazuyoshi Ogasawara, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/208,898

(22) Filed: Dec. 4, 2018

(65) Prior Publication Data

US 2019/0171011 A1   Jun. 6, 2019

(30) Foreign Application Priority Data

Dec. 6, 2017   (JP) .................................. 2017-233999

(51) Int. Cl.
  *G02B 27/01*   (2006.01)
  *B60K 35/00*   (2006.01)
(52) U.S. Cl.
  CPC .......... *G02B 27/0103* (2013.01); *B60K 35/00* (2013.01); *G02B 27/0179* (2013.01); *B60K 2370/149* (2019.05); *B60K 2370/1529* (2019.05); *B60K 2370/186* (2019.05); *B60K 2370/21* (2019.05); *B60K 2370/27* (2019.05); *B60K 2370/29* (2019.05); *G02B 2027/011* (2013.01)
(58) Field of Classification Search
  CPC ............ G02B 27/0103; G02B 27/0179; G02B 2370/186; G02B 2370/27; G02B 2370/21; G02B 2370/29; G02B 2027/011; B60K 35/00

USPC ............................................................. 345/9
  See application file for complete search history.

(56) References Cited

U.S. PATENT DOCUMENTS

| 9,317,895 | B1* | 4/2016 | Tidwell ................... G06T 3/005 |
| 2015/0062141 | A1* | 3/2015 | Hayasaka ................. B60R 1/00 345/581 |
| 2015/0379697 | A1* | 12/2015 | Pohl .................... G02B 27/0172 345/589 |
| 2017/0295353 | A1* | 10/2017 | Hwang ................ H04N 13/366 |

FOREIGN PATENT DOCUMENTS

JP           10-149085 A      6/1998

* cited by examiner

*Primary Examiner* — Mark Edwards
(74) *Attorney, Agent, or Firm* — Sughrue Mion, PLLC

(57) ABSTRACT

A display device for a vehicle displays an image at the time of seeing a three-dimensional object for distortion correction formed in a virtual space, from a reference eye point of a driver, on a display, as a display image. A controller performs texture mapping by pasting an original display image to the three-dimensional object for distortion correction, in the virtual space, and adjusts the three-dimensional object for distortion correction, according to a positional change between the reference eye point and an actual eye point. An adjustment unit changes a position of the three-dimensional object for distortion correction from a reference position, according to the positional change.

4 Claims, 7 Drawing Sheets

DISPLAY DEVICE FOR VEHICLE

CROSS-REFERENCE TO RELATED APPLICATION(S)

The present application claims priority to and incorporates by reference the entire contents of Japanese Patent Application No. 2017-233999 filed in Japan on Dec. 6, 2017.

BACKGROUND OF THE INVENTION

1. Field of the Invention

The present invention relates to a display device for a vehicle.

2. Description of the Related Art

Recently, there is a case where a display device for a vehicle, such as a head up display (HUD), is mounted on a vehicle such as an automobile. In the display device for a vehicle, there is a display device which projects a display image to be displayed on a display, on a wind shield through an optical system such as a reflection mirror, and thus, allows the display image to be viewed by a driver, as a virtual image. In such a display device for a vehicle, a distortion occurs in the virtual image due to the wind shield or the optical system, and thus, there is a concern that visibility decreases. For example, in Japanese Patent Application Laid-open No. H10-149085, a technology is disclosed, in which the display image is corrected by being distorted in advance, in order to offset the distortion in the virtual image by using a planar distortion correction map.

However, in the conventional display device for a vehicle, it is necessary to prepare a plurality of distortion correction maps in a distortion manner different for each viewpoint position in order to respond to a change in the viewpoint position of the driver, but it is difficult to accurately correct countless viewpoint positions since there is a limitation on memory capacity.

SUMMARY OF THE INVENTION

An object of the present invention is to provide a display device for a vehicle, which is capable of accurately adjusting a display image according to a change in a viewpoint position of a driver.

In order to achieve the above mentioned object, a display device for a vehicle according to one aspect of the present invention, which reflects a display image to be displayed on a display, on an optical system, projects the display image on a wind shield of the vehicle, and allows a virtual image corresponding to the display image projected onto the wind shield, to be viewed by a driver from a viewpoint position of the driver of the vehicle, the display device for a vehicle includes: a detection unit that detects an actual viewpoint position of the driver; and a controller that prepares the display image on a basis of an original display image, wherein the controller displays an image at a time of seeing a three-dimensional object for distortion correction formed in a virtual space, from a reference viewpoint position of the driver, on the display, as the display image, the controller includes an acquisition unit that acquires the original display image, a texture mapping unit that performs texture mapping by pasting the original display image to the three-dimensional object for distortion correction, in the virtual space, and an adjustment unit that adjusts the three-dimensional object for distortion correction, according to a positional change between the reference viewpoint position and the actual viewpoint position, in the virtual space, the three-dimensional object for distortion correction is a curved surface model which is reversely distorted to offset a distortion occurring in the virtual image with respect to the display image, due to at least one of the wind shield and the optical system, and the adjustment unit changes a position of the three-dimensional object for distortion correction from a reference position, according to the positional change.

According to another aspect of the present invention, in the display device for a vehicle, it is possible to configure that the adjustment unit moves the position of the three-dimensional object for distortion correction in an up-down direction or a right-left direction, or inclines the position in the up-down direction or the right-left direction, with respect to the reference position.

According to still another aspect of the present invention, in the display device for a vehicle, it is possible to configure that the controller includes a plurality of the three-dimensional objects for distortion correction which are formed for each vehicle type of the vehicle, and reads out the three-dimensional object for distortion correction corresponding to the vehicle type.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a display device for a vehicle according to an embodiment of the present invention will be described in detail, with reference to the drawings. Furthermore, the present invention is not limited by the embodiment described below. In addition, constituents in the embodiment described below include a constituent which can be easily substituted by a person skilled in the art, or substantially the same constituent. In addition, in the constituents of the embodiment described below, various omissions, substitutions, and modifications can be performed within a range not departing from the gist of the present invention.

Embodiment

Figure 1:
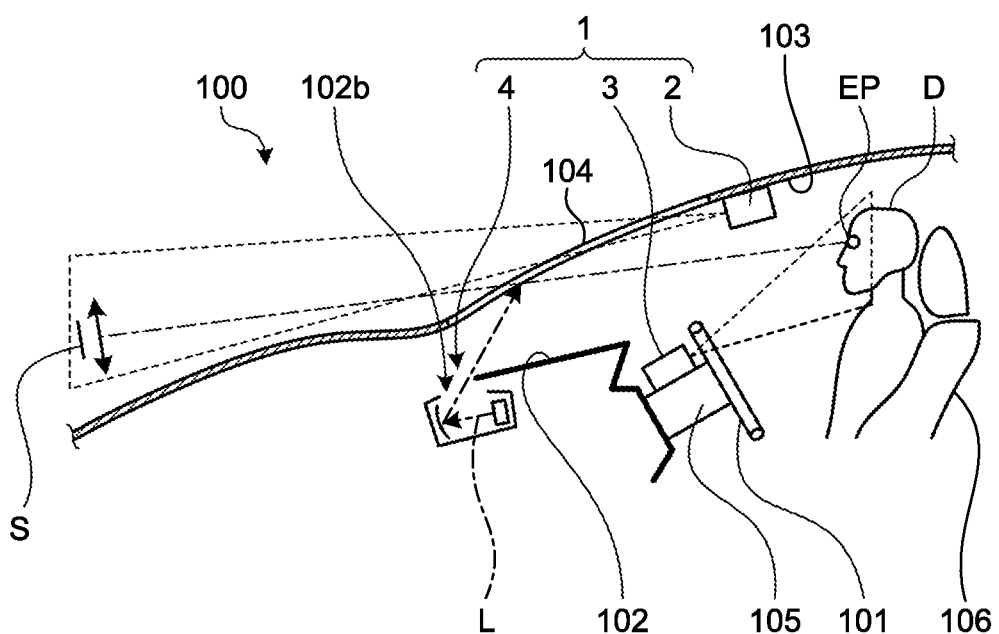
FIG. 1 is a schematic view illustrating a schematic configuration of a vehicle on which a display device for a vehicle according to an embodiment is mounted.
Figure 1:
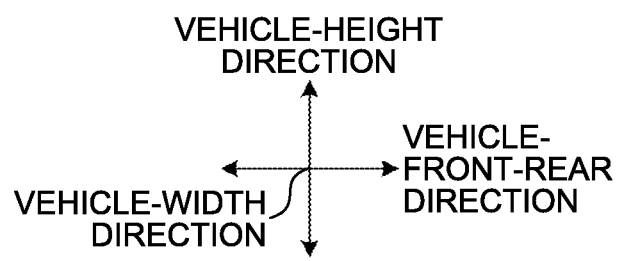
Figure 2:
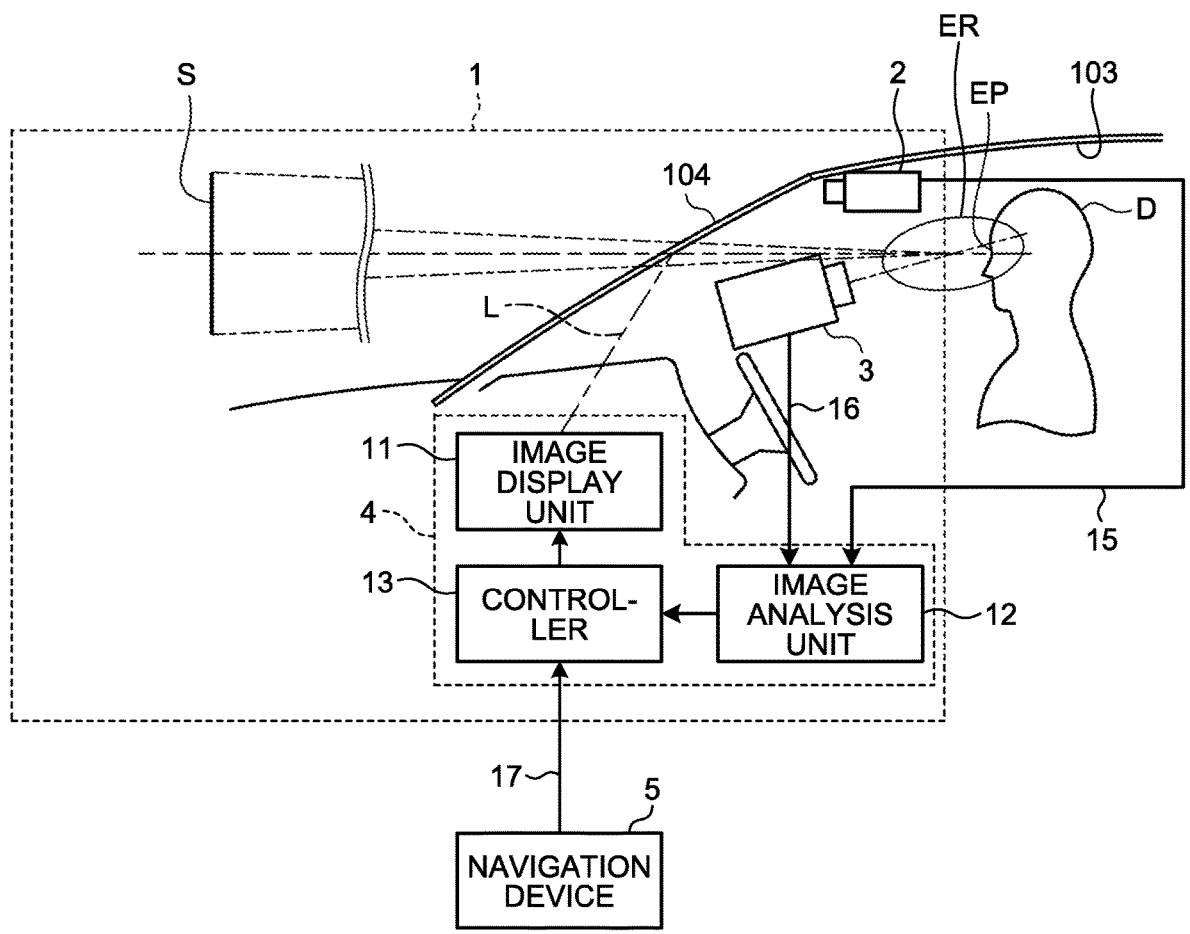
FIG. 2 is a schematic view of a schematic configuration of the display device for a vehicle according to the embodiment.
Figure 3:
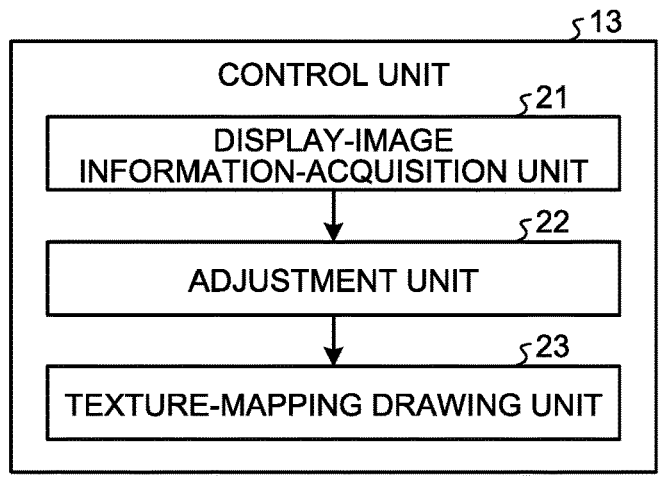
FIG. 3 is a block diagram illustrating a schematic configuration of a controller of the display device for a vehicle according to the embodiment.

A display device 1 for a vehicle according to this embodiment, illustrated in FIG. 1 and FIG. 2, for example, is an HUD which is mounted on a vehicle 100 such as an automobile. The display device 1 for a vehicle reflects a display image P on an optical system, projects the display image P on a wind shield 104 of a vehicle 100, and allows a virtual image S corresponding to the display image P projected on the wind shield 104, to be viewed from a viewpoint position (an eye point EP) of a driver D of the vehicle 100. The display device 1 for a vehicle of this embodiment displays the virtual image S by superimposing the virtual image S on the actual background in front of the vehicle. The wind shield 104 is semi-transmissive, and reflects display light L incident from the display device 1 for a vehicle, towards the eye point EP of the driver D. The eye point EP is included in an eye range ER in which eyes of the driver D determined in advance according to the vehicle 100, are positioned. Typically, the eye range ER corresponds to a region which is determined from a statistical distribution of the position of the eyes of the driver D in the vehicle 100, for example, a region in which the position of the eyes of the driver D is included at a predetermined ratio (for example, 95%), in a state where the driver D is seated in a driver seat 106. In a case where at least the eye point EP is in the eye range ER, the driver D is capable of viewing the display image P projected on the wind shield 104, as the virtual image S existing in front of the vehicle 100. The display image P is displayed on a display 18 configuring the display device 1 for a vehicle, is reflected on the optical system, and is projected on the wind shield 104. The display image P, for example, is route guidance information to be provided in notification to the driver D, and includes a traveling direction of the vehicle 100, a distance to an intersection, traffic information, vehicle information, and the like. The display device 1 for a vehicle of this embodiment includes a vehicle front camera 2, a driver camera 3, and a device main body 4.

The vehicle front camera 2 is a monocular camera or a compound-eye type camera, is arranged in the vehicle 100, and continuously images the actual background in front of the vehicle through the wind shield 104. The vehicle front camera 2, for example, is arranged on a roof 103 or a rearview mirror (not illustrated) in the vehicle. The vehicle front camera 2 is connected to the device main body 4 through a communication line 15, and sequentially outputs the imaged front image to the device main body 4. In the front image, a moving image is also included.

The driver camera 3 is arranged in the vehicle 100, and continuously images the face of the driver D including both eyes. The driver camera 3, for example, is arranged in an upper portion of a steering column 105 in the vehicle, and in back of a steering wheel 101 at the time of being seen from the driver D. The driver camera 3 of this embodiment configures a detection unit detecting an actual viewpoint position (an actual eye point EPr) of the driver D, along with an image analysis unit 12 described below. The driver camera 3 is connected to the device main body 4 through a communication line 16, and sequentially outputs the imaged image to the device main body 4 through the communication line 16, as a driver image. In the driver image, a moving image is also included.

The device main body 4 projects the display image P on the wind shield 104. The device main body 4, for example, is arranged on the inside of an instrument panel 102 of the vehicle 100. The device main body 4 is connected to a navigation device 5 mounted on the vehicle 100. As illustrated in FIG. 2, the device main body 4 of this embodiment, includes an image display unit 11, an image analysis unit 12, and a controller 13.

The image display unit 11 is a portion which reflects the display image P to be displayed on the display 18, on the optical system, and projects the display image P on the wind shield of the vehicle. The display 18, for example, is configured of a thin film transistor-liquid crystal display (TFT-LCD) or the like. The display 18 emits the display light L corresponding to the display image P. The optical system is configured of a planar mirror, a concave mirror, or the like. The optical system reflects the display light L emitted from the display 18, towards the wind shield 104. The display light L reflected on the optical system, is reflected from the wind shield 104 towards the driver D, and is displayed as the virtual image S to be displayed in front of the vehicle at the time of being seen from the eye point EP of the driver D.

The image analysis unit 12 is the detection unit described above, and detects the actual eye point EPr of the driver D, on the basis of the driver image input from the driver camera 3. The image analysis unit 12 inputs the driver image from the driver camera 3 through the communication line 16. The image analysis unit 12 detects the actual eye point EPr of the driver D from the input driver image, as a coordinate position. The image analysis unit 12, for example, detects the actual eye point EPr of the driver D, on the basis of the position of an iris of an ocular bulb or a glabella in a face portion, in the driver image. The image analysis unit 12 outputs eye point information indicating the detected actual eye point EPr of the driver D, to the controller 13. The eye point information, for example, is three-dimensional orthogonal coordinates.

In addition, the image analysis unit 12 detects a superimposition target which exists in front of the vehicle 100, on the basis of the front image input from the vehicle front camera 2. The superimposition target is a target on which the virtual image S is displayed by being superimposed, in the actual background, and for example, includes a vehicle traveling or stopping in front, a pedestrian, a white line, road marking, and the like. The image analysis unit 12 inputs the front image from the vehicle front camera 2 through the communication line 15. The image analysis unit 12 detects the superimposition target from the input front image. The image analysis unit 12 outputs superimposition target information indicating position information of the detected superimposition target, to the controller 13.

The controller 13, for example, is a graphics display controller (GDC), and is configured of a system-on-a-chip (SoC). The controller 13, for example, performs processing illustrated in flowcharts of FIG. 4 and FIG. 6 described below, by using a function of the GDC. The controller 13 of this embodiment prepares the display image P, on the basis of an original display image Po. The original display image Po is an image which is the origin of the display image P to be displayed on the display 18. The controller 13 is connected to the navigation device 5, and acquires the original display image Po from the navigation device 5, on the basis of the superimposition target information. The controller 13 of this embodiment displays an image at the time of seeing a 3D (three-dimensional) object 20 for distortion correction formed in a virtual space VS, from a reference viewpoint position (the reference eye point EPs) of the driver D, on the display 18, as the display image P. The 3D object 20 for distortion correction, is a curved surface model which is reversely distorted to offset a distortion occurring in the virtual image S with respect to the display image P, due to at least one of the wind shield 104 and the optical system. In addition, the controller 13 outputs the display image P to the image display unit 11, and displays the display image P on the image display unit 11 by superimposing the display image P on the actual background. The controller 13 finely adjusts the position of the display image P, according to the position of the acquired actual eye point EPr. The controller 13 includes a display-image information-acquisition unit 21, an adjustment unit 22, and a texture-mapping drawing unit 23.

The display-image information-acquisition unit 21 is an acquisition unit, and acquires information by analyzing the acquisition or the image of the original display image Po. The display-image information-acquisition unit 21, for example, acquires the original display image Po from the navigation device 5. Here, the original display image Po, for example, is characters, figures, symbols, and the like, indicating a route in a car navigation function, and includes so-called turn-by-turn, and the like. The display-image information-acquisition unit 21 transmits the acquired original display image Po to the texture-mapping drawing unit 23. In addition, the display-image information-acquisition unit 21 acquires information corresponding to the characters, the figures, the symbols, and the like, indicating the route (including the turn-by-turn and the like), from the navigation device 5, prepares an image based on the information, and transmits the image to the texture-mapping drawing unit 23. In addition, the display-image information-acquisition unit 21 may calculate a position by recognizing the front of the vehicle, a person, or the like, or may recognize a road shape, and prepare information based the road shape, on the basis of the image input from the vehicle front camera 2.

The adjustment unit 22 is an adjustment unit, and performs calculation for adjusting the 3D object 20 for distortion correction, according to a positional change between the reference eye point EPs and the actual eye point EPr, in the virtual space VS. The adjustment unit 22 changes the position of the 3D object 20 for distortion correction from the reference position, according to the positional change between the reference eye point EPs and the actual eye point EPr of the driver D. The positional change between the reference eye point EPs and the actual eye point EPr, for example, is a difference between the coordinates of the reference eye point EPs and the coordinates of the actual eye point EPr in an orthogonal coordinate system on the plane. The adjustment unit 22 moves the position of the 3D object 20 for distortion correction in an up-down direction or a right-left direction, or inclines the position in the up-down direction or the right-left direction, with respect to the reference position. The up-down direction, for example, is a vehicle-height direction, and the right-left direction is a vehicle-width direction. Furthermore, the inclination includes a rotation in the up-down direction or the right-left direction.

The texture-mapping drawing unit 23 is a texture mapping unit. The texture-mapping drawing unit 23 is a portion which performs texture mapping, and prepares drawing output, and performs the texture mapping by pasting the original display image Po to the 3D object 20 for distortion correction, in the virtual space VS. The texture-mapping drawing unit 23 extends the original display image Po, and pastes the original display image Po to a front surface 20a of the 3D object 20 for distortion correction, and thus, performs the texture mapping. The front surface 20a is a curved surface at the time of seeing the 3D object 20 for distortion correction from the reference eye point EPs. The texture-mapping drawing unit 23 outputs an image at the time of seeing the 3D object 20 for distortion correction subjected to the texture mapping, from the reference eye point EPs, to the image display unit 11, as the display image P, in the virtual space VS.

The navigation device 5 is a so-called car navigation, and for example, is a device which provides the position of the own vehicle or detailed map information of the periphery to the driver D, and performs route guidance to a destination. The navigation device 5 acquires the position of the own vehicle on the basis of information or the like from a global positioning system (GPS) satellite. In addition, the navigation device 5 reads out map information, route guidance information, or the like, from an internal memory, or acquires the information from the outside by communication. The navigation device 5 is connected to the controller 13 through a communication line 17, and outputs the acquired position information or various information items of the own vehicle to the controller 13 through the communication line 17.

Next, a preparation method of the 3D object 20 for distortion correction of the display device 1 for a vehicle according to the embodiment will be described. The 3D object 20 for distortion correction of this embodiment is prepared in advance in a design stage of the vehicle 100.

Figure 8:
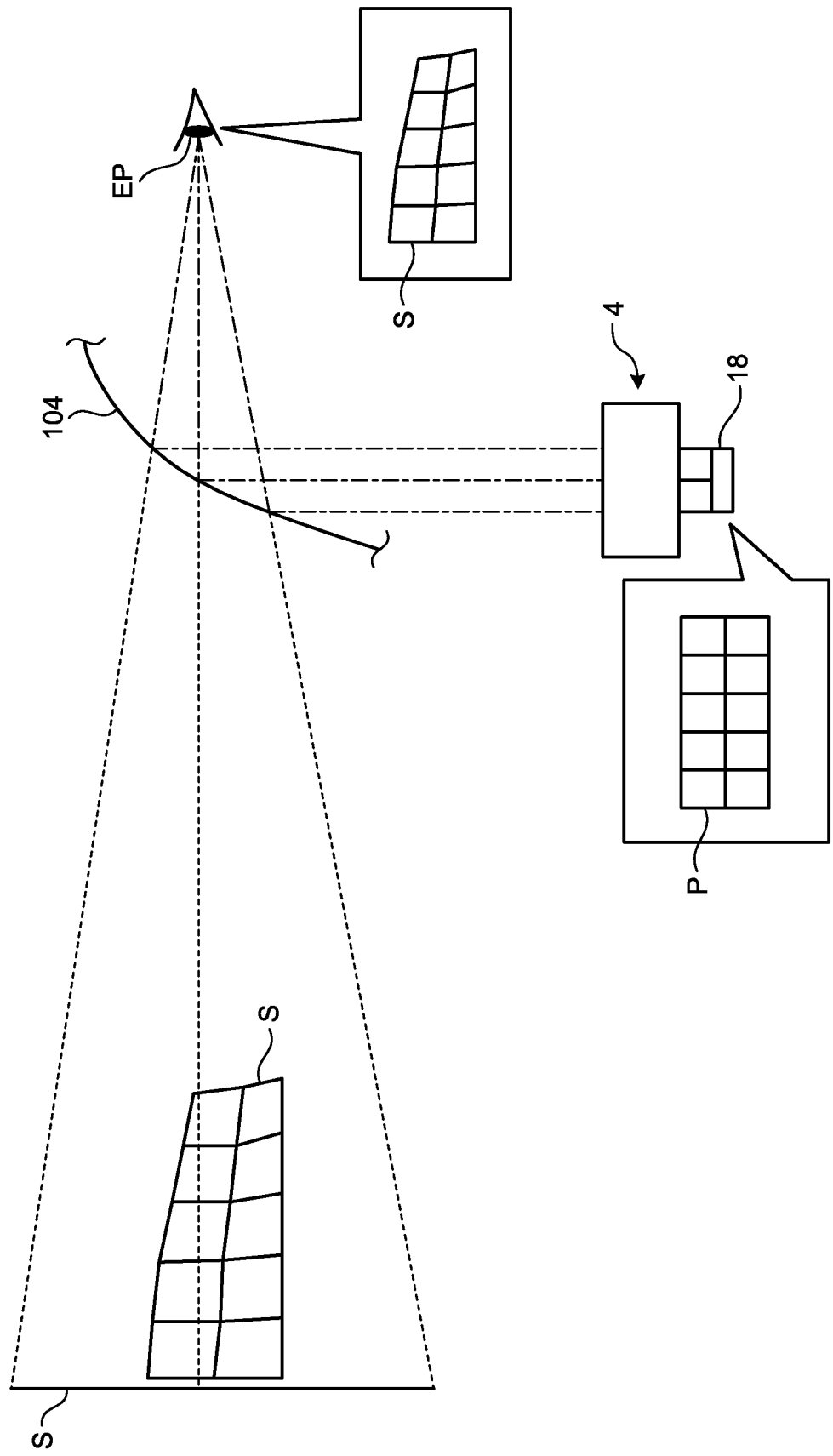
FIG. 8 is an explanatory diagram for describing a preparation method of the 3D object for distortion correction of the display device for a vehicle according to the embodiment.
Figure 9:
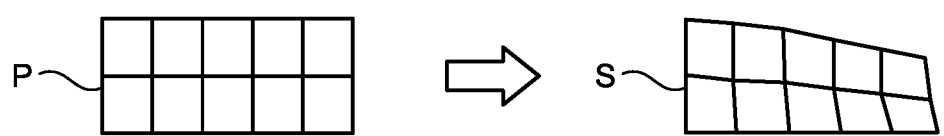
FIG. 9 is another explanatory diagram for describing the preparation method of the 3D object for distortion correction of the display device for a vehicle according to the embodiment.
Figure 9:
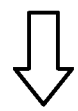
Figure 9:
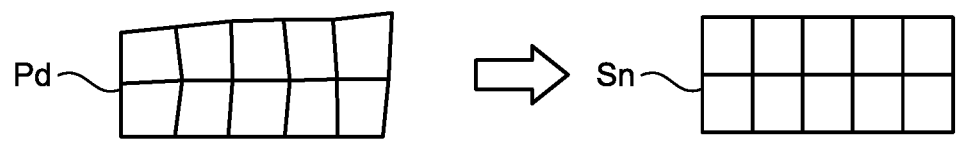

First, optical simulation is performed on the basis of design information of the wind shield 104 or the optical system, actual vehicle arrangement information of the device main body 4, the driver, or the camera, and the like, and a correction map M on the plane is prepared. For example, as illustrated in FIG. 8 and FIG. 9, a grid-like display image P, which is a reference, is displayed on the display 18, with respect to the reference eye point EPs, and how much the virtual image S is distorted with respect to the display image P, is measured. Specifically, each grid point of the display image P is compared with each grid point of the virtual image S, the coordinates of a displaced grid point are measured, and a displacement of each of the grid points is considered as a distortion amount. Then, a grid point which is reversely displaced with respect to each of the grid points of the display image P, is prepared as the correction map M, on the basis of the distortion amount. A display image Pd illustrated in FIG. 9, is a display image in which the display image P is pasted to the correction map M. A virtual image Sn is a virtual image which is projected on the wind shield 104, and is viewed by the driver D from the reference eye point EPs.

Figure 4:
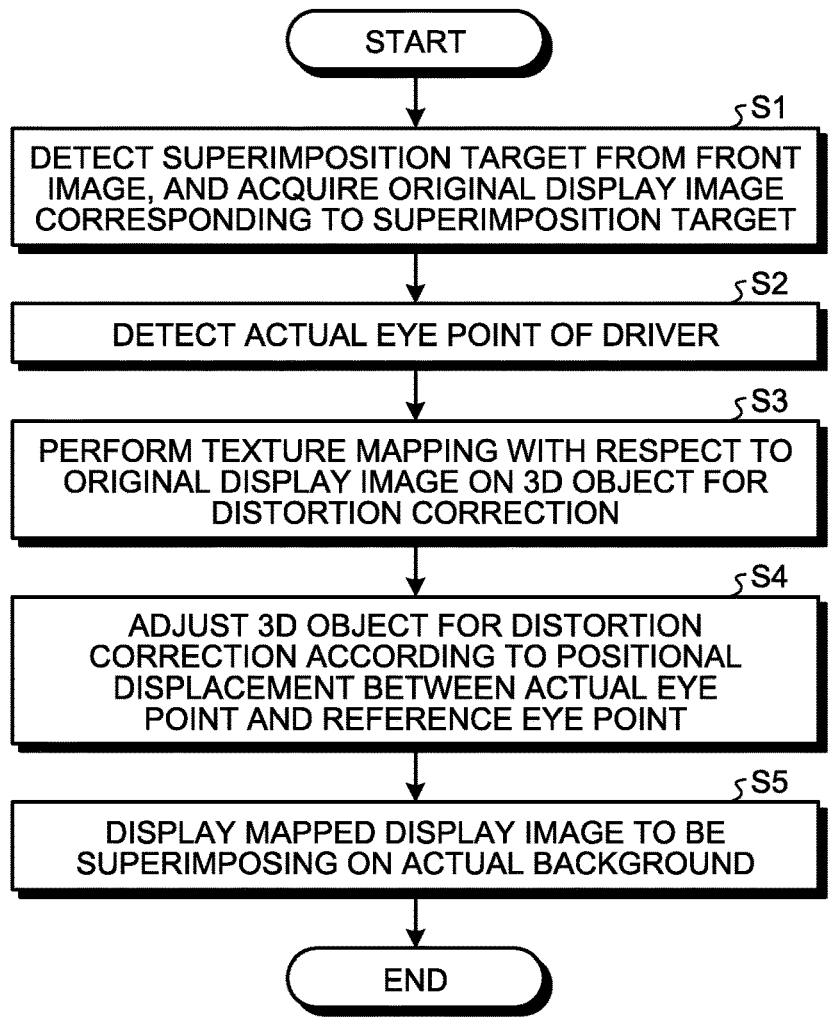
FIG. 4 is a flowchart diagram illustrating an example of image display processing of the display device for a vehicle according to the embodiment.
Figure 5:
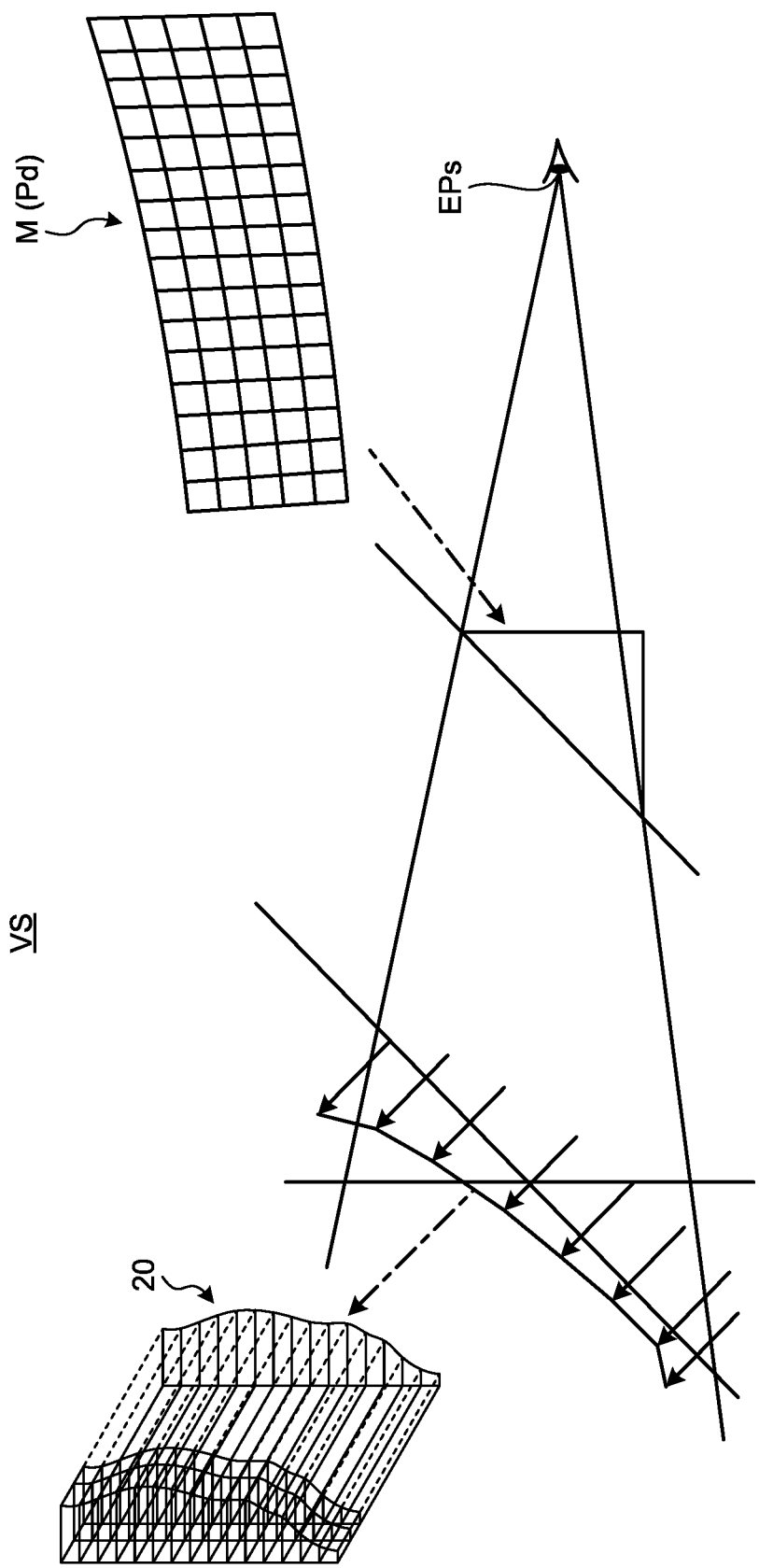
FIG. 5 is a view illustrating a schematic configuration of a 3D object for distortion correction of the display device for a vehicle according to the embodiment.

Next, as illustrated in FIG. 4, in the virtual space VS, the 3D object 20 for distortion correction is prepared by using the correction map M. For example, a designer pushes and pulls a plate polygon with respect to a 2D model, which is a reference, such that visibility from the reference eye point EPs of the driver D, which is set as a virtual viewpoint, overlaps with the correction map M, and deforms the 2D model into a 3D shape, and thus, prepare the 3D object 20 for distortion correction. The 3D object 20 for distortion correction, for example, is prepared such that visibility from each of the eye points EP in the eye range ER, overlaps with the correction map M corresponding to each of the eye points EP. Furthermore, the designer himself/herself may directly adjust the virtual image S while seeing the virtual image S in a state of being seated in the driver seat 106. Accordingly, it is possible to prepare the 3D object for distortion correction corresponding to the vehicle 100.

Next, an example of image display processing to be executed in the display device 1 for a vehicle will be described with reference to FIG. 4. This processing is executed along with the start of the vehicle 100 (for example, an ignition switch is turned ON), and is ended along with the stop of the vehicle 100 (for example, the ignition switch is turned OFF), but is not limited thereto. In addition, illustrated steps are not limited to the illustrated order.

In FIG. 4, in Step S1, the image analysis unit 12 detects the superimposition target from the front image, and outputs the superimposition target information indicating the superimposition target, to the controller 13. In the controller 13, the display-image information-acquisition unit 21 acquires the original display image Po corresponding to the superimposition target, from the navigation device 5, on the basis of the superimposition target information.

In Step S2, the image analysis unit 12 detects the actual eye point EPr of the driver D from the driver image, and outputs the eye point information indicating the actual eye point EPr, to the controller 13.

In Step S3, in the controller 13, the texture-mapping drawing unit 23 performs the texture mapping with respect to the original display image Po on the 3D object 20 for distortion correction, in the virtual space VS.

Figure 7:
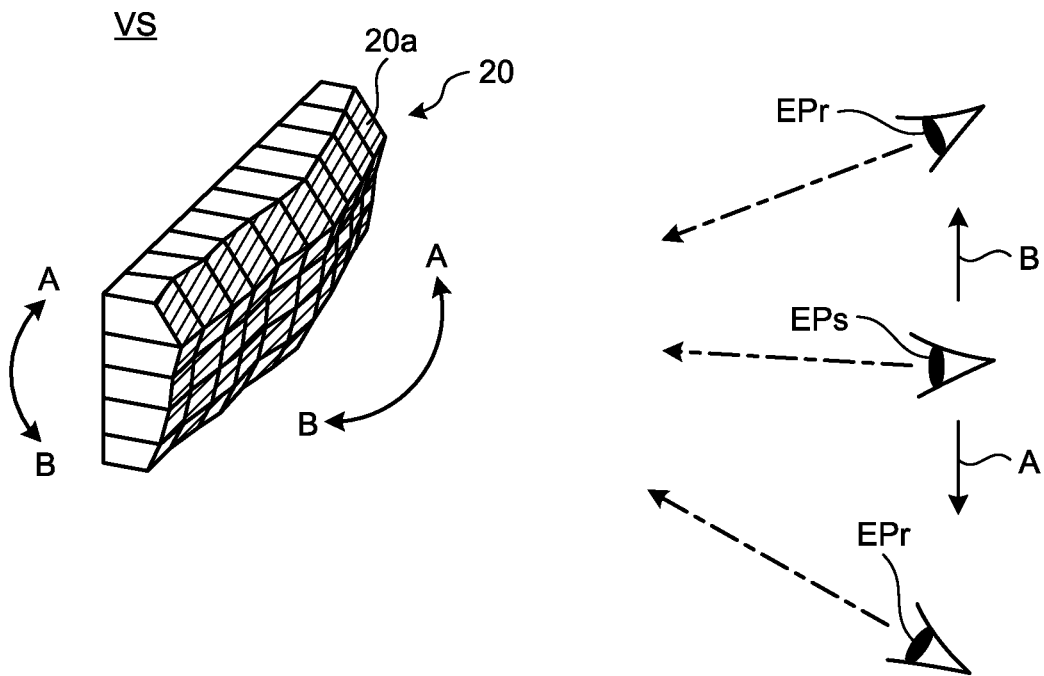
FIG. 7 is a schematic view illustrating an example of a correction operation of a display image of the display device for a vehicle according to the embodiment.

In Step S4, in the controller 13, the adjustment unit 22 adjusts the 3D object 20 for distortion correction, according to a positional displacement between the actual eye point EPr indicated in the input eye point information, and the reference eye point EPs set in advance. As illustrated in FIG. 7, the controller 13 moves or inclines the 3D object 20 for distortion correction in a direction opposite to a movement direction of the actual eye point EPr with respect to the reference eye point EPs. Furthermore, in a case where there is no positional displacement between the actual eye point EPr and the reference eye point EPs, this step may be omitted.

In Step S5, the controller 13 displays an image at the time of seeing the 3D object 20 for distortion correction from the reference eye point EPs of the driver D, on the display 18, as the display image P (the display image Pd). The controller 13 calculates a position where the display image P seems to overlap with the actual background from the actual eye point EPr and the position of the superimposition target, and arranges the display image P to be projected on the wind shield 104, in the calculated position. Furthermore, in a case where a plurality of display images are displayed, the display images are arranged such that all of the display images overlap with the actual background. After that, this processing is ended.

Figure 6:
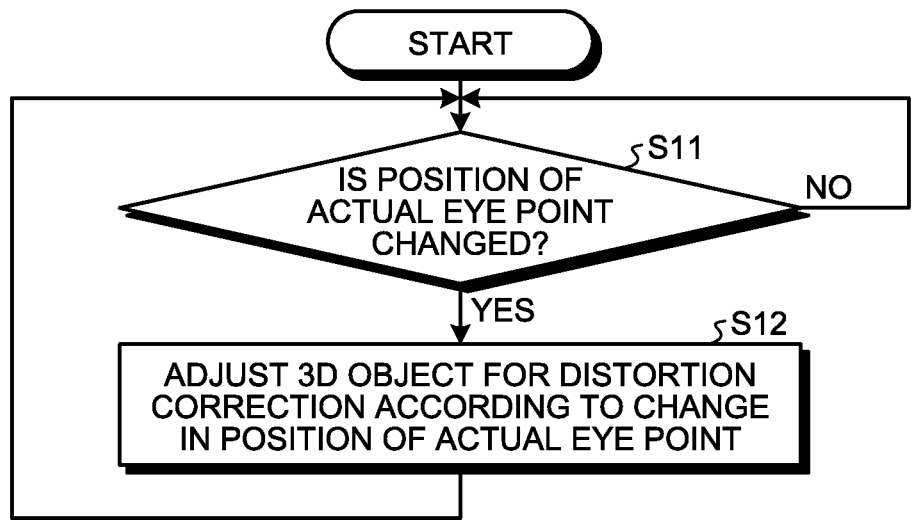
FIG. 6 is a flowchart diagram illustrating an example of adjustment processing of the 3D object for distortion correction of the display device for a vehicle according to the embodiment.

Next, an example of adjustment processing which is executed in the display device 1 for a vehicle, will be described with reference to FIG. 6 and FIG. 7. Processing of FIG. 6, is executed in a case where the actual eye point EPr is changed with time.

In Step S11, the controller 13 compares the previous actual eye point EPr detected by the image analysis unit 12 with the current actual eye point EPr, and determines whether or not the position is changed. In a case where the position of the actual eye point EPr is not changed, Step S11 is repeated, and in a case where the position of the actual eye point EPr is changed, the process proceeds to Step S12.

In Step S12, the controller 13 adjusts the 3D object 20 for distortion correction according to a change in the position of the actual eye point EPr, and the process returns to Step S11. In Step S12, as illustrated in FIG. 7, the 3D object 20 for distortion correction is moved or inclined in the direction opposite to the movement direction of the current actual eye point EPr with respect to the previous actual eye point EPr.

As described above, in the display device 1 for a vehicle according to this embodiment, the controller 13 displays the image at the time of seeing the 3D object 20 for distortion correction formed in the virtual space VS, from the reference eye point EPs of the driver D, on the display 18, as the display image P. Accordingly, even in the case of SoC not having a distortion correction function, it is possible to perform distortion correction by using a three-dimensional model, and to widen a selection width of the SoC in the design stage. In addition, one 3D model for distortion correction may be formed, and thus, it is possible to suppress an increase in drawing capacity. In addition, the display device 1 for a vehicle according to this embodiment performs the texture mapping by pasting the original display image Po to the 3D object 20 for distortion correction, in the virtual space VS, and adjusts the 3D object 20 for distortion correction according to a positional change between the reference eye point EPs and the actual eye point EPr. Accordingly, it is not necessary to prepare a plurality of correction maps M in a distortion manner different for each of the eye points EP of the driver D, and thus, it is possible to suppress an increase in the memory capacity. In addition, it is possible to perform display with smooth continuity even in the vicinity of the boundary of the plate polygon, by using a drawing method using a fragment shader. In addition, in the display device 1 for a vehicle according to this embodiment, the adjustment unit 22 changes the position of the 3D object 20 for distortion correction from the reference position, according to a positional change between the reference eye point EPs and the actual eye point EPr. Accordingly, it is possible to quickly follow up a minute change in the actual eye point EPr, and to more finely and smoothly perform the distortion correction. Further, it is possible to change the position of the 3D object 20 for distortion correction for a shorter time, according to a change in the actual eye point EPr, and thus, real-time properties are improved.

In addition, in the display device 1 for a vehicle according to the embodiment, the adjustment unit 22 moves the position of the 3D object 20 for distortion correction in the up-down direction or the right-left direction, or inclines the position in the up-down direction or the right-left direction, with respect to the reference position. Thus, it is possible to simplify the processing and to improve responsiveness, by limiting the movement direction or an inclination direction.

Furthermore, in the embodiment described above, the display device 1 for a vehicle includes one 3D object for distortion correction applied to the vehicle 100, with respect to the SoC, but is not limited thereto. For example, the SoC may include a plurality of 3D objects 20 for distortion correction formed for each vehicle type of the vehicle 100, and may read out the 3D object 20 for distortion correction corresponding to the vehicle type. Accordingly, it is possible to share components, and to suppress an increase in component cost.

In addition, in the embodiment described above, the controller 13 acquires the original display image Po from the navigation device 5, but is not limited thereto. For example, the controller 13 may acquire the route guidance information or the like, from the outside, by wireless communication.

In addition, in the embodiment described above, the display image P, for example, is the route guidance information, but may be information for supporting the driving of the driver D. For example, the display image P may be vehicle speed information, vehicle state information, road information, external environment information, passenger information, and the like.

In addition, in the embodiment described above, the superimposition target is subjected to the image recognition, but may be detected by radar or the like.

In addition, in the embodiment described above, the vehicle front camera 2 and the driver camera 3 are respectively connected to the device main body 4 through the communication lines 15 and 16 in a wired manner, but may be connected to the device main body 4 in a wireless manner. Accordingly, the communication lines 15 and 16 or a wiring operation are not necessary, and a layout restriction on the vehicle front camera 2 and the driver camera 3 can be improved.

A program to be executed in the display device 1 for a vehicle according to the embodiment, described above, for example, may be provided by being incorporated in advance in the SoC, or may be provided by being installed in the GDC from the outside.

According to the display device for a vehicle of the present embodiments, it is possible to accurately adjust the display image according to a change in the viewpoint position of the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, which reflects a display image to be displayed on a display, on an optical system, projects the display image on a wind shield of the vehicle, and allows a virtual image corresponding to the display image projected onto the wind shield, to be viewed by a driver from a viewpoint position of the driver of the vehicle, the display device comprising:

a detection unit that is configured to detect an actual viewpoint position of the driver; and a controller that is configured to prepare the display image on a basis of an original display image, wherein the controller is configured to display an image at a time of seeing a three-dimensional object for distortion correction formed in a virtual space, from a reference viewpoint position of the driver, on the display, as the display image, the controller includes an acquisition unit that is configured to acquire the original display image, a texture mapping unit that is configured to perform texture mapping by pasting the original display image to the three-dimensional object for distortion correction, in the virtual space, and an adjustment unit that is configured to determine an amount of a positional change and a direction of the positional change from a coordinate position corresponding to the reference viewpoint position in the virtual space and a coordinate position corresponding to the actual viewpoint position in the virtual space, and is configured to change a position of the three-dimensional object for distortion correction from a reference position, matching to the amount of the positional change, in the virtual space, the adjustment unit is configured to move the position of the three-dimensional object for distortion correction, according to the direction of the positional change, in an up-down direction or a right-left direction with respect to the reference position, or is configured to incline the position of the three-dimensional object for distortion correction, according to the direction of the positional change, in the up-down direction or the right-left direction, and the three-dimensional object for distortion correction is a curved surface model which is reversely distorted to offset a distortion occurring in the virtual image with respect to the display image, due to at least one of the wind shield and the optical system.

2. The display device for the vehicle according to claim 1, wherein the controller includes a plurality of the three-dimensional objects for distortion correction which are formed for each vehicle type of the vehicle, and is configured to read out the three-dimensional object for distortion correction corresponding to the vehicle type.

3. The display device for the vehicle according to claim 1, further comprising:

an image analysis unit that is configured to detect a superimposition target which exists in front of the vehicle, wherein the controller is configured to calculate a display position where the display image overlaps with the superimposition target based on a position of the superimposition target detected by the image analysis unit and the actual viewpoint position, and is configured to control the display of the display image at the display position.

4. The display device for the vehicle according to claim 1, wherein the reference viewpoint position is set in advance before determining any physical position of the driver.

* * * * *